US009562829B2

(12) United States Patent  
Di Vincenzo et al.

(10) Patent No.: US 9,562,829 B2  
(45) Date of Patent: Feb. 7, 2017

(54) VANE POSITION SENSOR INSTALLATION WITHIN A TURBINE CASE

(71) Applicant: Hamilton Sundstrand Corporation, Charlotte, NC (US)

(72) Inventors: Gregory Di Vincenzo, Wethersfield, CT (US); Francis P. Marocchini, Somers, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 160 days.

(21) Appl. No.: 14/529,872

(22) Filed: Oct. 31, 2014

(65) Prior Publication Data  
US 2016/0123845 A1 May 5, 2016

(51) Int. Cl.  
*G01M 15/14* (2006.01)  
*G01D 11/24* (2006.01)

(52) U.S. Cl.  
CPC ............ *G01M 15/14* (2013.01); *G01D 11/245* (2013.01)

(58) Field of Classification Search  
CPC ............ F01D 17/12; F01D 17/02; F01D 9/02; G01D 5/145  
USPC ..................... 324/166–174; 290/4, 55, 54, 43  
See application file for complete search history.

(56) References Cited

U.S. PATENT DOCUMENTS

| 6,895,751 | B1* | 5/2005 | Greentree | F02B 37/24 60/602 |
| 7,393,179 | B1* | 7/2008 | Kesseli | F01D 17/143 415/126 |
| 2009/0322094 | A1* | 12/2009 | Mahawili | F04B 9/10 290/55 |
| 2011/0268554 | A1* | 11/2011 | Minto | F01D 9/041 415/1 |
| 2013/0084179 | A1* | 4/2013 | Mantese | F01D 17/162 416/1 |
| 2016/0040550 | A1* | 2/2016 | Do | F01D 17/162 415/1 |

* cited by examiner

*Primary Examiner* — Vinh Nguyen  
*Assistant Examiner* — Alvardo Fortich  
(74) *Attorney, Agent, or Firm* — Cantor Colburn LLP (57) ABSTRACT

A measuring system for sensing vane positions that comprises a turbine, a target, and a bellows. The turbine includes a plurality of articulating vanes, with each vane being coupled to a sync ring that is configured to position the plurality of articulating vanes in accordance with a degree of rotation by the sync ring. The target is coupled to a first position of the turbine within a first region that is associated with a first vane of the plurality of articulating vanes. The bellows coupled to the turbine and configured to maintain a sensor reference point at a second position. The sensor reference point at the second position is maintained by the bellows in relation to the target at the first position across a gap.

14 Claims, 4 Drawing Sheets

VANE POSITION SENSOR INSTALLATION WITHIN A TURBINE CASE

This invention was made with Government support under contract number N00014-09-D-0821 awarded by the United States Navy. The Government has certain rights in the invention.

BACKGROUND

The disclosure relates generally to sensing a vane position within a turbine case, and more specifically, to utilizing at least one of multiple sensing technologies installed on the vane platform via bracketing to sense over a gap a vane position.

In general, a jet engine turbine employs a variable cycle technology to synchronously rotate turbine blades to an optimal position, where each optimal position corresponds a maximum engine efficiency with an engine thrust. However, the exact position of the turbine blades is extremely difficult to detect. To date, there are no technical solutions to solve how to precisely monitor the positions of the turbine blades.

SUMMARY

According to one aspect of the invention, a system for sensing vane positions is provided. The system comprises a turbine including a plurality of articulating vanes, wherein each vane coupled to a sync ring, wherein the sync ring is configured to position the plurality of articulating vanes in accordance with a degree of rotation by the sync ring; a target coupled to a first position within a first region of the turbine, wherein the first position is associated with a first vane of the plurality of articulating vanes; and a bellows coupled to the turbine and configured to maintain a sensor reference point at a second position, wherein sensor reference point at the second position is maintained in relation to the target at the first position across a gap.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, there are no technical solutions for turbine blade position sensing of a jet engine turbine. Thus, what is needed is a system, method, and/or computer program product configured to optimally sense vane positions.

In general, embodiments of the present invention disclosed herein may include a measuring system, methodologies, and/or computer program product that detects and analyzes vane position sensor data acquired from within a high pressure, high temperature zone of a turbine engine (e.g., 1,500 degrees F.). The vane positions are monitored by any one of multiple sensing technologies at the source (e.g., at the actual vane), such that all other error variables and noise contributions in and of the turbine engine are eliminated.

For instance, the multiple sensing technologies are installed using a bellows at the tip of the sensor to ensure an accuracy requirement is met while exposed to various temperature and dimensional instabilities resident in the location of the actual vanes being sense. That is, the bellows negates the effects of thermal and dimensional instabilities. Further, the sensing position is across a gap thru the use of locating a sensor face (or other component) as close as possible to the target located on the vane being measured. The sensor tip is mounted thru a structure or bracket located and supported on the vane platform, which also eliminates the thermal instabilities and limits, to a small amount, the dimensional instabilities. The vane position is then monitored over an angular stroke of 33 degrees thru the use of a wedged target that for every angle of displacement correlates to a point on the wedge angle. The wedge angle is then optimized to establish the accuracy requirement.

Figure 1:
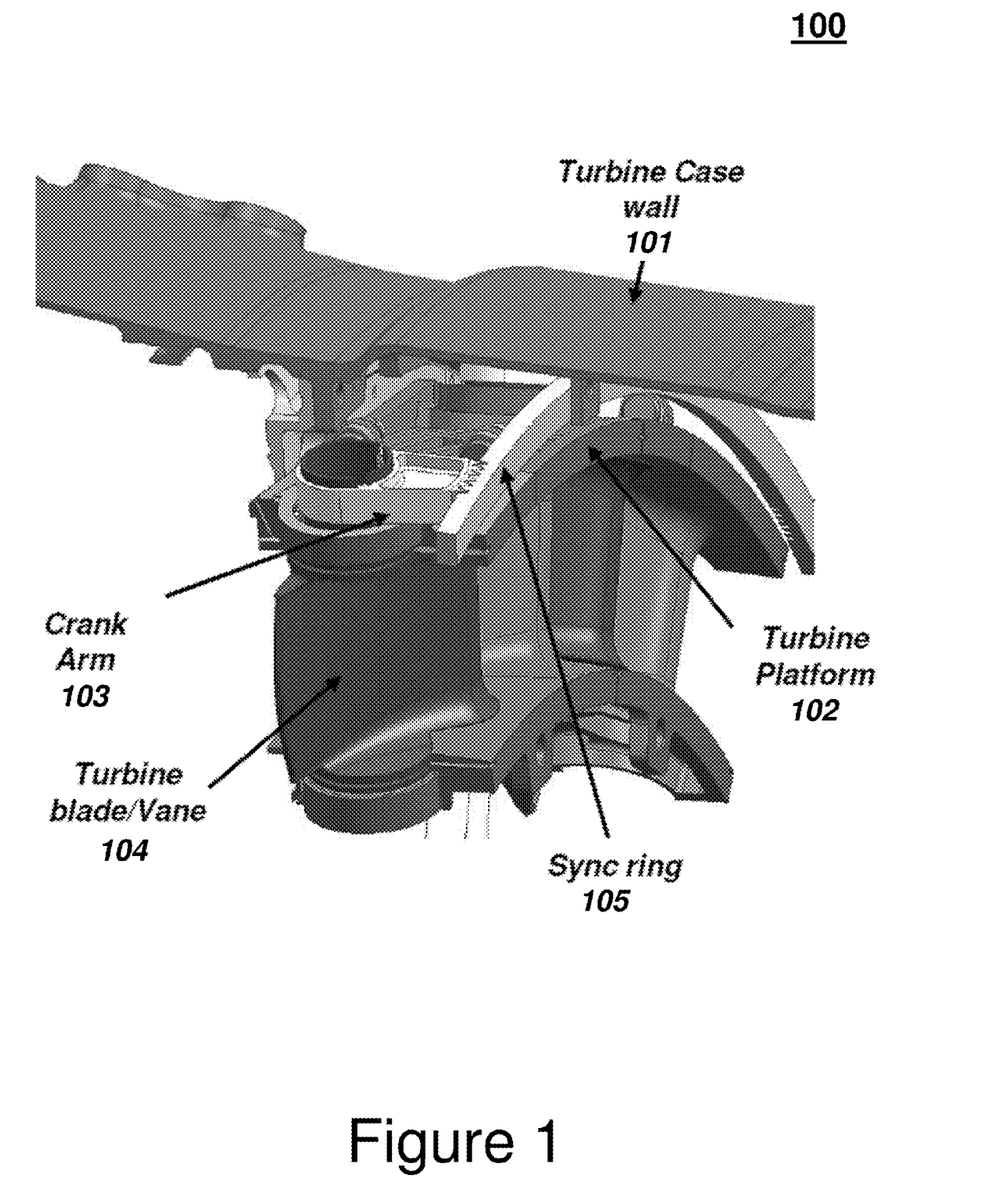
FIG. 1 illustrates a schematic of a jet engine turbine.

For example, FIG. 1 illustrates a schematic of a jet engine turbine 100. The jet turbine includes a turbine case wall 101, a turbine platform 102, a crank arm 103, a turbine vane 104, and a sync ring 105. In operation, the jet engine turbine 100 employs a variable cycle technology to synchronously rotate the sync ring 105, which is attached to each turbine vane 104 via a crank arm 103, such that each turbine vane 104 may be adjusted to an optimal position for greater engine efficiency. For instance, the sync ring 105 is rotated over an angular stroke of 33 degrees in accordance with locations of a series of targets, where every angle of displacement correlates to a different position of a series of positions for the turbine vane 104

Although a jet engine turbine 100 configuration is illustrated and described in the disclosed embodiment, other engine environments, configurations, and/or machines, such as ground vehicles, rotary aircraft, turbofan engines, high speed compound rotary wing aircraft with supplemental translational thrust systems, dual contra-rotating, coaxial rotor system aircraft, turbo-props, tilt-rotors and tilt-wing aircraft, and the like may also benefit from the embodiments described herein.

Figure 2:
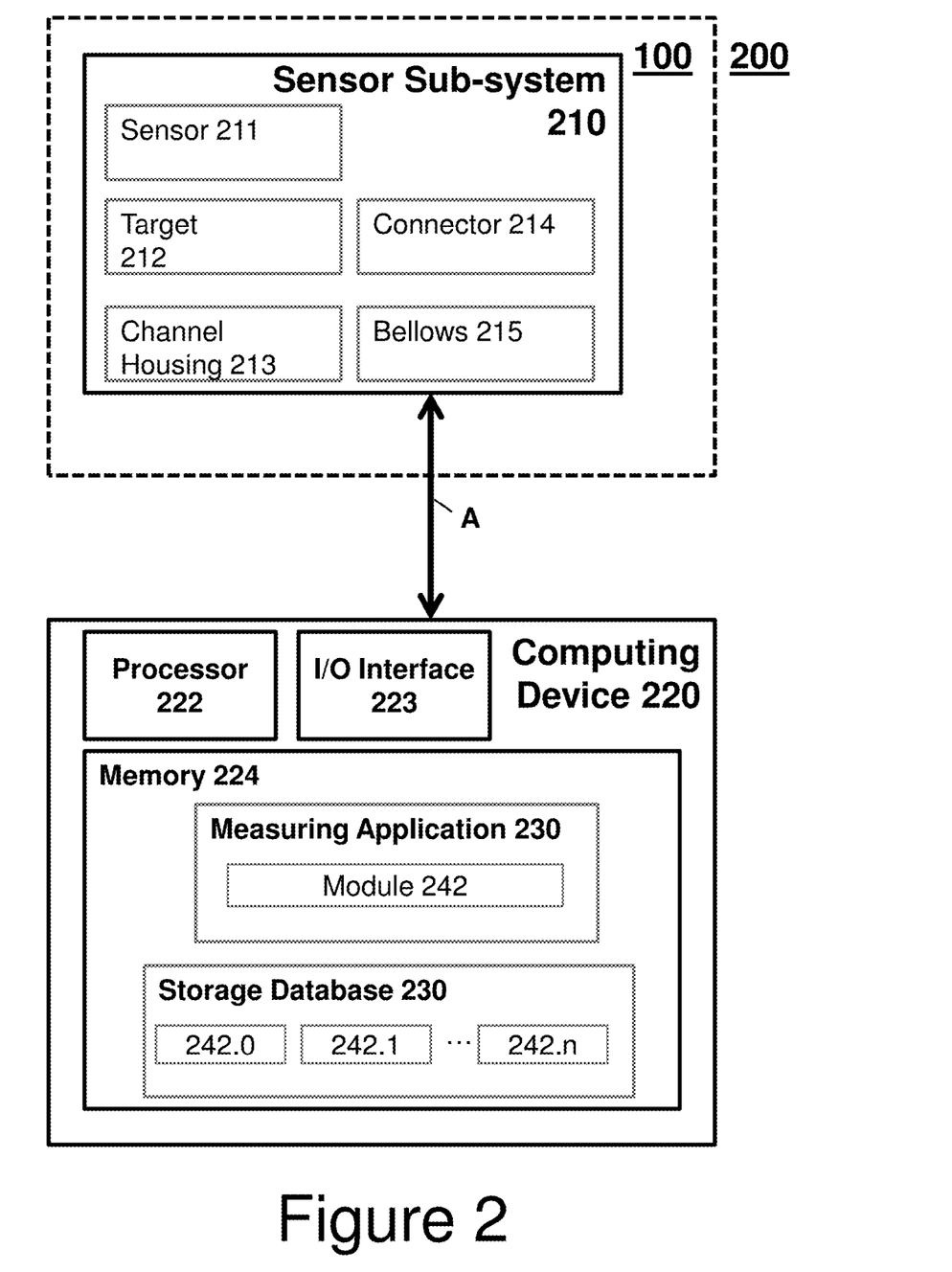
FIG. 2 illustrates a sensor sub-system in communication with a computing device in accordance with an embodiment.

FIG. 2 illustrates one embodiment of a measuring system 200. The measuring system 200 comprises a sensor sub-system 210 coupled with the jet engine turbine 100. The sensor sub-system 210 may generally include at least one sensor 211, a target 212, a channel housing 213, a bellows 215, and a connector 214. The sensor sub-system 205 is communicatively coupled, as represented by Arrow A, with a computing device 210, which may be incorporated with or external to teach other. The measuring system 200, the sensor sub-system 210, and the computing device 220 may include and/or employ any number and combination of sensors, computing devices, and networks utilizing various communication technologies, as described below, that enable the measuring system 200 to perform the measuring process, as further described with respect to FIG. 4

In operation, the measuring system 200, which is integral to the jet engine turbine 100, as represented by dashed-box, reliably and automatically measures vane position sensor data bases on an orientation between the sensor 211 and the target 212. For instance, the sensor sub-system 210 senses every angle of displacement by the sync ring 105, in accordance with locations of the target 212 with respect to the sensor 211. Each location is then provided as vane position sensor data to the computing device 220 for further processing. The computing device 220 then correlates the vane position sensor data to a vane position of the turbine vane 104, with an accuracy of 0.5% full scale over the 33 degree articulation angle.

The sensor sub-system 210 includes at least one sensor 211 that is operatively coupled to the jet engine turbine 100 via a bracket and a corresponding target 212 for each sensor. While the precise location of each sensor 211 and target 212 may vary, each combination is associated with one of the articulating vanes so that a stroke at that vane is measured. In this way, when a plurality of combinations are employed, the measuring system 200 can sense a plurality of vane positions of a plurality of turbine vanes 104 using a corresponding number of targets 212 and sensors 211.

The sensor 211, in general, is a converter that measure physical quantities and converts these physical quantities into a signal (e.g., vane position sensor data) that is sent to the computing system 210. Examples of sensing technologies include, but are not limited to microwave sensing, eddy current sensing, capacitance sensing, and inductive sensing. Since the sensor 211 is located in the high pressure, high temperature zone of the jet engine turbine 100, such as where between the turbine case wall 101 and the turbine platform 102, a high temperature sensing can be employed. Further, the sensor 211 may utilize a sensor reference point to determine an orientation of the target. For instance, if a capacitive sensor is employed, the sensor reference point may be a surface of the capacitive sensor that is maintained at a position inside the high pressure, high temperature zone by the bellows 215. In turn, the distance between the surface of the capacitive sensor and the target 212 will correlate to a position of the turbine vane 104. In another embodiment, if a microwave sensor is employed, the sensor reference point may be a component that is maintained at a position inside the high pressure, high temperature zone by the bellows. In this way, the microwave sensor may be placed outside of the high pressure, high temperature zone while detecting the distance between the component and the target 212.

The target 212 is a platform fixed or coupled to a specific location defined during installation of a particular embodiment of the sensor sub-system 210. As further described below, the target may be in association with the crank arm 103. The target 212 may include an incline (e.g., a wedge angle used to optimize an accuracy requirement) such that the orientation between the sensor 211 and the target 212 changes as the turbine vanes 105 are articulated. For example, the surface of the incline will alter a gap between a sensor focus of the sensor 211, which is on the target 212, and the sensor 211, as the target 212 moves along a plane orthogonal to the sensor 211. Thus, the vane position may then be monitored over an angular stroke of 33 degrees thru the use of a wedged target that for every angle of displacement correlates to a point on the wedge angle.

The channel housing 213 is a mechanical unit or tube that may penetrate through a plurality of outer wall of the turbine (e.g., the turbine case wall 101) such that a sensor reference point may be inside the high pressure, high temperature zone, while other components are protected from that zone. In this way, rather than utilizing an expensive sensor with a high durability inside the high pressure, high temperature zone, a sensor 211 may be placed anywhere within or against the channel housing 213 and still be configured to detect the target 212 with respect to the sensor reference point.

The connector 214 is a physical mechanism utilized by the sensor sub-system 210 to communicate to the computing device 220. That is, the connector 214 may be configured to receive or send signals (e.g., vane position sensor data) to or from the computing device 220. An example of the connector 214 may include any communication interface, such as copper transmission cables, optical transmission fibers, and/or wireless transmission technologies.

The bellows 215 is a flexible, extensible tubing or way covers used to protect the channel housing and to a pressure seal a hole in the turbine case wall 101 created by the measuring system 200. The bellows 215 is further configured to maintain a sensor reference point at a position inside the high pressure, high temperature zone above the target 212. In this way, a gap is formed between the target 212 and bellows 215. The gap itself changes as the orientation of the target 212 changes; however, the position of the sensor reference point is maintained. Thus, as the pressure and temperature changes throughout the jet engine turbine 100, thereby causing the materials and component of the jet engine turbine 100 to flex, expand, and contract, the bellows 215 provides the sensor reference point at a constant position with respect to the target 215.

The computing device 220 includes a processor 222, input/output (I/O) interface, and a memory 224. The memory 224 may further store a measuring application 230, which includes a module 232, and/or a storage database 240, which includes data 242. The computing device 220 (e.g., a computing device as described below) is configured to provide a measuring process, where the processor 222 may receive computer readable program instructions from the measuring application 230 of the memory 224 and execute these instructions, thereby performing one or more processes defined by the measuring application 230. Also, the computing device 100 may utilize the storage database 240 to archive and store signals received from the sensor sub-system 210 and/or data computed by the measuring application 230, as data 242. It is to be appreciated that the computing device 220 is schematically depicted and the location of the computing device 220 may vary. In particular, the computing device 220 may be integrated within the sensor sub-system 210 or may be disposed at a remote location in a wired or wireless communicative state with the sensor sub-system 210.

The processor 222 may include any processing hardware, software, or combination of hardware and software utilized by the computing device 220 that carries out the computer readable program instructions by performing arithmetical, logical, and/or input/output operations. Examples of the processor 222 include, but are not limited to an arithmetic logic unit, which performs arithmetic and logical operations; a control unit, which extracts, decodes, and executes instructions from a memory; and an array unit, which utilizes multiple parallel computing elements.

The I/O interface 223 may include a physical and/or virtual mechanism utilized by the computing device 220 to communicate between elements internal and/or external to the computing device 220. That is, the I/O interface 223 may be configured to receive or send signals or data within or for the computing device 220 (e.g., to and from the connector 214). An example of the I/O interface 223 may include a network adapter card or network interface configured to receive computer readable program instructions from a network and forward the computer readable program instructions, original records, or the like for storage in a computer readable storage medium (e.g., memory 224) within the respective computing/processing device (e.g., computing device 220).

The memory 224 may include a tangible device that retains and stores computer readable program instructions, as provided by the measuring application 230, for use by the processor 222 of the computing device 220.

The measuring application 230 ("application 230") comprises computer readable program instructions configured to receive and respond to signals from the sensor sub-system 210 and/or user inputs instructing the application 230 to operate in a particular manner. The application 230 includes and is configured to utilize a module 232 to perform measurement and self-calibrating algorithms during articulation of the turbine vanes 104 by the sync ring 105. The application 230 takes advantage of greater position accuracy by the sensing sub-system 205 in accordance with its direct location at the turbine vanes 104. In turn, the application 203 enables greater throttle control, e.g., when an aircraft is performing intense maneuvers, such as carrier landings and short take off and landings. Further, the application 230 takes advantage of the greater position accuracy by multiple sensing technologies by allowing the selection of a particular sensing technology best suited to meet performance requirements as an overall accuracy budget.

While single items are illustrated for the application 230 (and other items by each Figure), these representations are not intended to be limiting and thus, the application 230 items may represent a plurality of applications. For example, multiple measuring applications in different locations may be utilized to access the collected information, and in turn those same applications may be used for on-demand data retrieval. In addition, although one modular breakdown of the application 230 is offered, it should be understood that the same operability may be provided using fewer, greater, or differently named modules. Although it is not specifically illustrated in the figures, the applications may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 240 may include a database, such as described above data repository or other data store and may include various kinds of mechanisms for storing, accessing, and retrieving various kinds of data, including a hierarchical database, a set of files in a file system, an application database in a proprietary format, a relational database management system (RDBMS), etc., capable of storing data 242. The storage database 240 is in communication with the application 230 of and/or applications external to the computing device 220, such that information, data structures, and documents including data 242 may be collected and archived in support of the processes described herein (e.g., measuring process).

As illustrated in FIG. 2, the storage database 240 includes the data 242, illustrated as data 242.0 to data structure 242.n, where 'n' is an integer representing a number structures archived by the storage database 240. Although one exemplary numbering sequence for the data 242 of the storage database 240 is offered, it should be understood that the same operability may be provided using fewer, greater, or differently implemented sequences. The storage database 240 may generally be included within the computing device 220 employing a computer operating system such as one of those mentioned above. A data structure (e.g., the individual instances of the data 242) is a mechanism of electronically storing and organizing information and/or managing large amounts of information. Thus, the data 242 are illustrative of sensor outputs, calculation outputs, and historical information that are stored for use by the application 230. Examples of data structure types include, but are not limited to, arrays, which store a number of elements in a specific order; records, which are values that contains other values; hash tables, which are dictionaries in which name-value pairs can be added and deleted; sets, which are abstract data structures that store specific values without any particular order and repeated values; graphs and trees, which are linked abstract data structures composed of nodes, where each node contains a value and also one or more pointers to other nodes; and objects, which contain data fields and program code fragments for accessing or modifying those fields.

The measuring system 200 and elements therein of the Figures may take many different forms and include multiple and/or alternate components and facilities. That is, while the measuring system 200 is shown in FIG. 2, the components illustrated in FIG. 2 and other Figures are not intended to be limiting. Indeed, additional or alternative components and/or implementations may be used. The measuring system 200 is schematically illustrated in greater detail with respect to FIG. 3.

Figure 3:
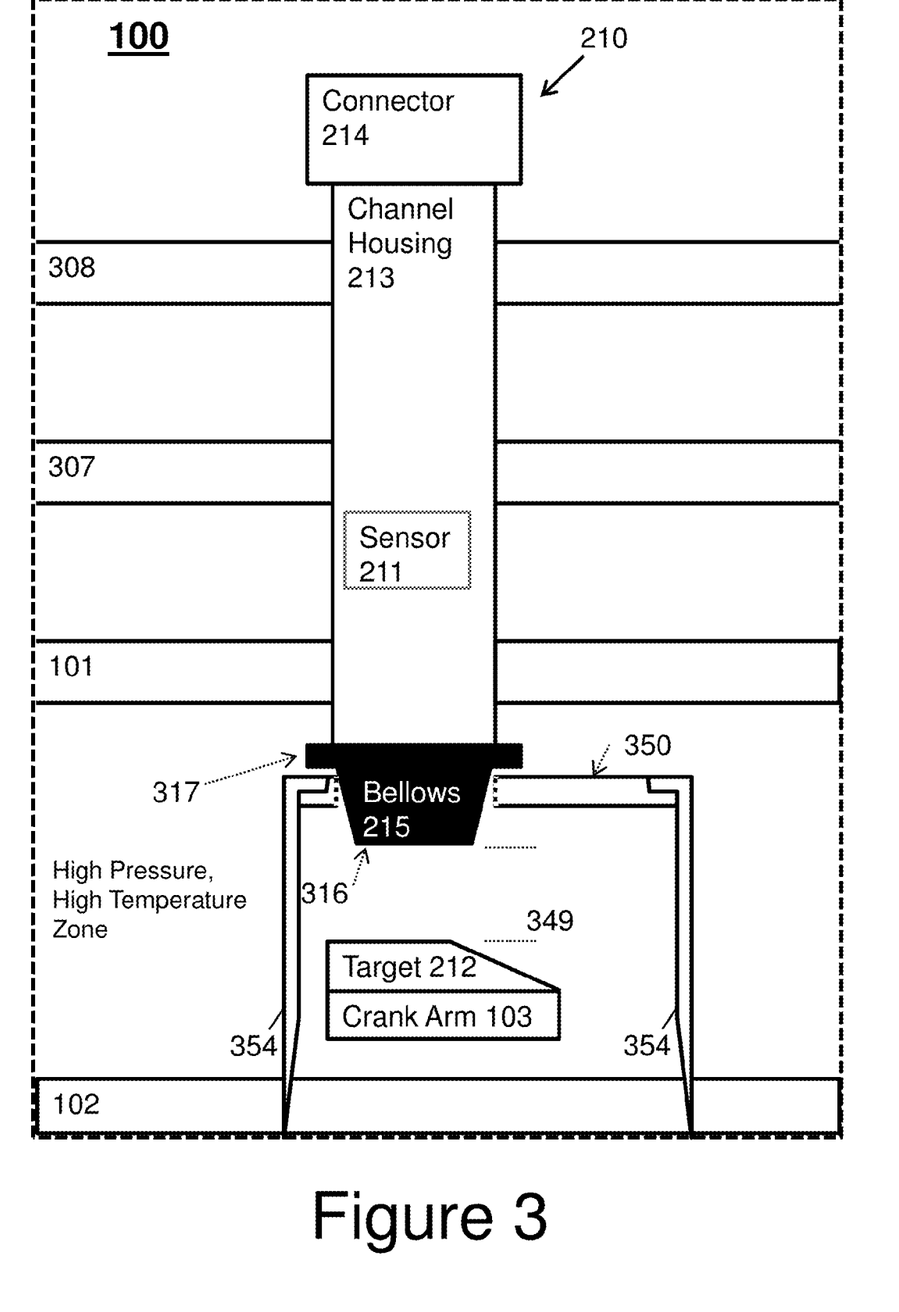
FIG. 3 illustrates a schematic of a sensor sub-system in accordance with an embodiment.

FIG. 3 illustrates a schematic of a sensor sub-system 310 in accordance with an embodiment. The sensor sub-system 410 includes a plurality of turbine walls 101, 307. 308, a sensor 211, a target 212, a channel housing 213, a connector 214, a bellows 215, a sensor reference point 316, a bellow shoulder 317, a controlled gap 349, and a station support 350 attached to the turbine platform 102 via support structures 354. As illustrated, a station support 350 enables the bellows 215 to hover over the target 215. The station support 350 may be configured with at least one support structure 354 secured to any portion of the turbine, such as the turbine platform 102 as illustrated. Further, the bellows 215 may include a spring characteristic that forces the sensor reference point 250 below the station support 350, such that the sensor reference point 250 and the surface target maintain the controlled gap 349. The controlled gap 349 itself remains at a constant value because the position of the sensor reference point 316 is maintained by the bellow 215, such that as the orientation of the target 212 changes a position of the turbine vanes 104 is detected thru the use of a wedged portion of the target (e.g., for every angle of displacement correlates to a point on the wedge angle); however,. Thus, as the pressure and temperature changes throughout the jet engine turbine 100, thereby causing the materials and component of the jet engine turbine 100 to flex, expand, and contract, the bellows 215 provides the sensor reference point 316 at a constant position with respect to the target 212. In one, embodiment, the sensor 211 may be positioned at the tip of the bellow, such as with an inductive or capacitive sensor. Note that the channel housing 123 penetrates through the turbine walls 101, 307. 308, such that a sensor reference point 316 may be inside the high pressure, high temperature zone, while other components (e.g., such as the connector 214) are protected from that zone. Therefore, in another embodiment, the sensor 211 (e.g., a microwave sensor) may be positioned at an end of the channel housing 213 opposite the bellows 215. In this regard, the microwave sensor may detect the distance between the component, which is at the sensor reference point 316, and the target 212.

Figure 4:
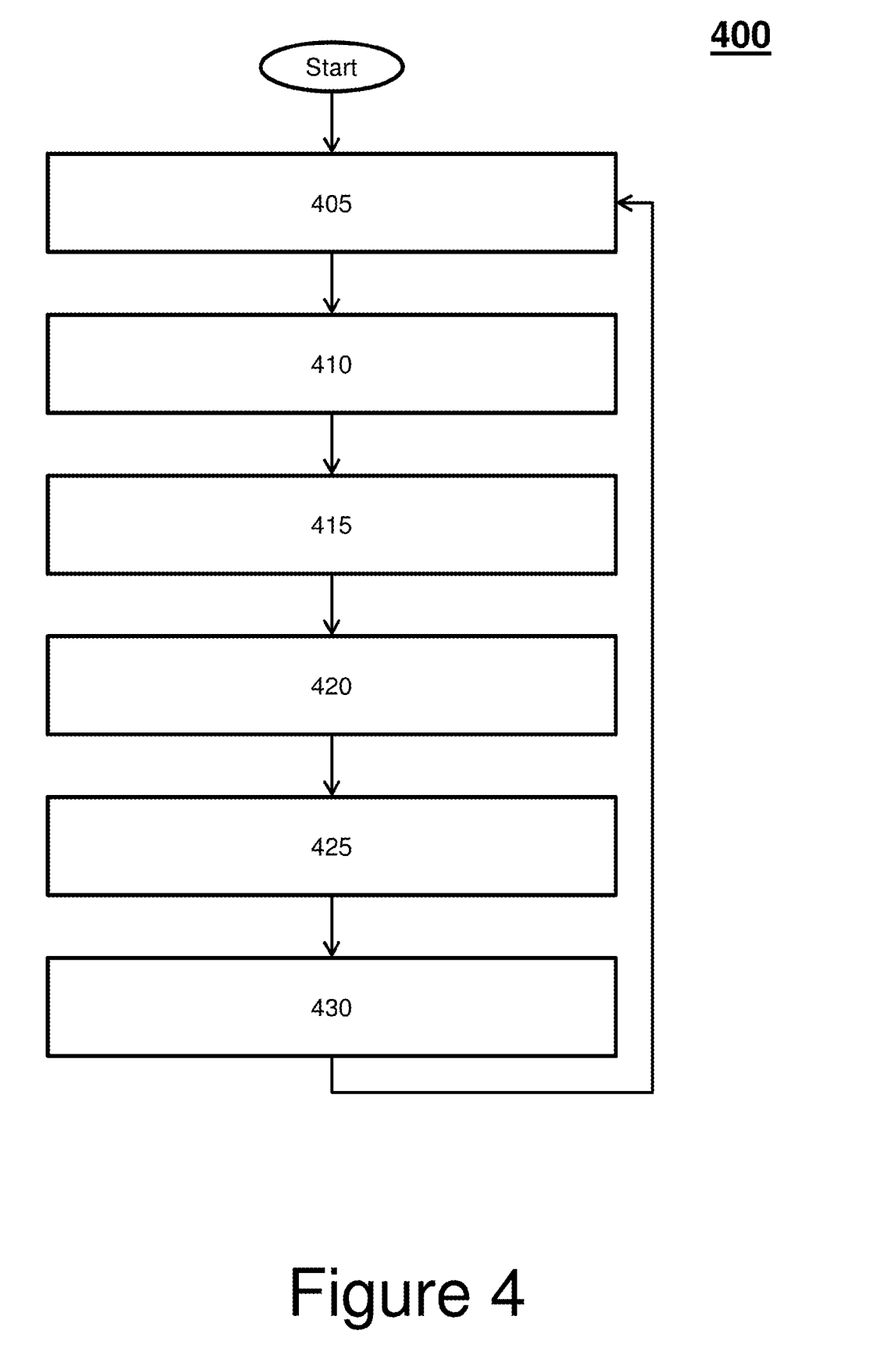
FIG. 4 illustrates an exemplary process flow in accordance with an embodiment.

FIG. 4 illustrates a process flow 400, which may be implemented by any of the measuring systems (e.g., 200) described above. The process flow 400 begins at block 405 when the sensor sub-system 210 via a plurality of sensors 211 in combination with a plurality of corresponding targets 212 detects a first set of locations, where each location corresponds to a vane position of a turbine vane 105 associated with a particular combination. The plurality of sensors then, at block 410, output signals to the computing device 220 for further processing.

At block 415, the application 230 performs signal processing on the output signals to derive the vane position sensor data. Next, at block 420, the application 220 analyzes the vane position sensor data in conjunction with measurement and self-calibrating algorithms. Next, at block 425, the application 230 outputs notifications based on the analysis of the vane position sensor data. In general, the notifications are signals to a control sub-system of the sync ring 105 that provide feedback for accurately adjusting and/or maintaining the positions of the turbine vanes 104 via the sync ring 105 for optimal efficiency of the jet engine turbine 100 during a corresponding set of flight conditions. In addition, the notifications can be are identifying information (or non-existence of the information) targeted to the systems or users responsible for the aircraft 12, so that appropriate maintenance can be performed when, for example, an alignment of the sync ring is incorrect.

The process flow 400 then proceeds to block 430, where the control sub-system adjusts and/or maintains the positions of the turbine vanes 104 in accordance with the notification of the application 230. The process 400 continues or loops to block 405, where the sensor sub-system 210 via the plurality of sensor/target combinations with detects a second set of locations. In this way, the measuring system can detect immediate positions of the turbine vanes 105 and also detect over time trends in the jet engine turbine 100 operations. These trends may then be utilized to predict maintenance and or/failure, which increases the safety and life of the jet engine turbine.

In view of the above, the systems, sub-systems, and/or computing devices, such as measuring system (e.g., sensor sub-system 205 and computing device 210 of FIG. 2), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

Computing devices may include a processor (e.g., a processor 222 of FIG. 2) and a computer readable storage medium (e.g., a memory 224 of FIG. 2), where the processor receives computer readable program instructions, e.g., from the computer readable storage medium, and executes these instructions, thereby performing one or more processes, including one or more of the processes described herein (e.g., measuring process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, measuring system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of measuring system and method.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A measuring system, comprising:
a turbine including a plurality of articulating vanes, wherein each vane coupled to a sync ring, wherein the sync ring is configured to position the plurality of articulating vanes in accordance with a degree of rotation by the sync ring;
a target coupled to a first position within a first region of the turbine, wherein the first position is associated with a first vane of the plurality of articulating vanes; and
a bellows coupled to the turbine and configured to maintain a sensor reference point at a second position, wherein sensor reference point at the second position is maintained in relation to the target at the first position across a gap.

2. The measuring system of claim 1, further comprising:
a channel housing penetrating through a plurality of outer walls of the turbine, wherein a first outer wall of the plurality of outer walls defines a boundary of the first region.

3. The measuring system of claim 1, further comprising:
a sensor configured to detect an orientation of the target with respect to the sensor reference point, wherein the orientation of the target corresponds to a vane position of the first vane.

4. The measuring system of claim 1, wherein the first position is on a crank arm associated with the first vane.

5. The measuring system of claim 1, wherein the first region is a high temperature and high pressure zone between a turbine case wall of the turbine and a turbine platform of the turbine.

6. The measuring system of claim 1, wherein the turbine is a jet engine turbine employed by an aircraft.

7. The measuring system of claim 1, wherein the sensor is selected from one of an eddy current sensor, a capacitive sensor, and a microwave sensor.

8. A apparatus for sensing vane positions, comprising:
a target coupled to a first position within a first region of a turbine, wherein the turbine includes a plurality of articulating vanes, wherein each vane coupled to a sync ring, wherein the sync ring is configured to position the plurality of articulating vanes in accordance with a degree of rotation by the sync ring, wherein the first position is associated with a first vane of the plurality of articulating vanes; and
a bellows coupled to the turbine and configured to maintain a sensor reference point at a second position, wherein sensor reference point at the second position is maintained in relation to the target at the first position across a gap.

9. The apparatus of claim 8, further comprising:
a channel housing penetrating through a plurality of outer walls of the turbine, wherein a first outer wall of the plurality of outer walls defines a boundary of the first region.

10. The apparatus of claim 8, further comprising:
a sensor configured to detect an orientation of the target with respect to the sensor reference point, wherein the orientation of the target corresponds to a vane position of the first vane.

11. The apparatus of claim 8, wherein the first position is on a crank arm associated with the first vane.

12. The apparatus of claim 8, wherein the first region is a high temperature and high pressure zone between a turbine case wall of the turbine and a turbine platform of the turbine.

13. The apparatus of claim 8, wherein the turbine is a jet engine turbine employed by an aircraft.

14. The apparatus of claim 8, wherein the sensor is selected from one of an eddy current sensor, a capacitive sensor, and a microwave sensor.

* * * * *